United States Patent [19]

Fischer et al.

[11] Patent Number: 5,059,310

[45] Date of Patent: Oct. 22, 1991

[54] ANALYTICAL SIEVE APPARATUS

[75] Inventors: Manfred Fischer; Horst Peterling, both of Remscheid; Johannes Kaiser, Dormagen; Klaus Keuser, Frechen-Buschbell; Wilheim Wüst, Troisdorf-Spich, all of Fed. Rep. of Germany

[73] Assignees: Rhewum GmbH, Remscheid; Quarzwerke GmbH, Frechen, both of Fed. Rep. of Germany

[21] Appl. No.: 574,347

[22] Filed: Aug. 29, 1990

[30] Foreign Application Priority Data

Aug. 31, 1989 [DE] Fed. Rep. of Germany ....... 3928872

[51] Int. Cl.[5] .......................... B07B 1/28; B07B 1/46; B07B 1/54; G01N 15/02

[52] U.S. Cl. .................................. 209/237; 73/865.5; 209/238; 209/239; 209/242; 209/260; 209/317; 209/319; 209/323; 209/382; 209/412

[58] Field of Search .......................... 209/11, 237-243, 209/247, 255, 257, 260, 315, 317, 319, 323, 379, 381, 382, 409, 412, 413; 73/865.5

[56] References Cited

U.S. PATENT DOCUMENTS

| | | | |
|---|---|---|---|
| 1,051,267 | 1/1913 | Rombauer | 209/233 |
| 2,782,926 | 2/1957 | Saxe | 209/237 |
| 2,975,898 | 3/1961 | Nelson | 209/238 |
| 3,098,037 | 7/1963 | Tonjes et al. | 209/237 X |
| 3,187,894 | 6/1965 | Garces | 209/319 |
| 3,425,552 | 2/1969 | Curtis | 209/239 |
| 3,439,800 | 4/1969 | Tonjes | 209/239 X |
| 3,545,281 | 12/1970 | Johnston | 209/239 X |
| 3,960,731 | 6/1976 | Brandt | 209/323 X |
| 4,929,346 | 5/1990 | Si-Lin | 209/323 |

FOREIGN PATENT DOCUMENTS

| | | | |
|---|---|---|---|
| 0561576 | 10/1932 | Fed. Rep. of Germany . | |
| 0612355 | 4/1935 | Fed. Rep. of Germany . | |
| 2605252 | 4/1988 | France | 209/239 |
| 0368546 | 1/1973 | U.S.S.R. | 73/865.5 |

OTHER PUBLICATIONS

Analysen-Siebgerate; Rhewum GmbH, Temscheid 11; Impulsgesteuertes Analysen-Siebgerat; Bauart A 2, 6 pages.

Drahtsiebboden fur Analysensiebe Masse, DIN 4188, Teil 1 & 2, Oct. 1977 Dk 621.928.028.3:620.168.32:539.215.2; 8 pp.

Siebanalyse, Partikelgrossenanalyse, DK 539.215.1:621.928.2, DIN 66165 Teil 1 & 2, Apr. 1987, 1 pages.

*Primary Examiner*—Michael S. Huppert
*Assistant Examiner*—Edward M. Wacyra
*Attorney, Agent, or Firm*—Herbert Dubno

[57] ABSTRACT

A vertical set of sieves receives the particulate material from a vibrating trough conveyor above the set and is vibrated by an agitator on the machine frame. The sieves are spread apart and then tilted to dump the collected particles into respective funnels. The set can then be swung back and contracted for the the next stage. The funnels are connected to collectors which are automatically weighted.

20 Claims, 10 Drawing Sheets

ANALYTICAL SIEVE APPARATUS

FIELD OF THE INVENTION

Our present invention relates to an analytical sieve apparatus and, more particularly, to an apparatus for the automatic or semiautomatic determination of particle-size distribution in a particulate material.

BACKGROUND OF THE INVENTION

An analytical sieve apparatus can make use of set of sieves below which is provided a sieve tray forming part of the stack. A particulate product to be subjected to particle-size analysis is deposited upon the upper sieve of the stack and the stack is agitated to cause particulate material to pass downwardly through the openings in the screening layers spanning the annular frames of the respective sieves. These openings are graded in steps to be progressively small downwardly, whereby only the material passing the smallest sieve will collect in the tray while, on each sieve above the tray, only the material passing the preceding sieve but not passing that sieve will collect.

An analytical sieve apparatus of that type is described in the brochure of Rhewum entitled "Analysen-Siebgeräte" Liste 2000, 12.86.

Sieve analyses are important over the entire range of particle-size measurement technology. They are used to determine particle-size distribution of flowable solid products, for example, dust, meal, powder or granulates and depending upon the product, can be carried out in a dry or wet phase.

The opening sizes of the sieves are graded downwardly in the stack in accordance with a particular standard. For example, the major widths of the sieves may be graded from top to bottom decreasingly in accordance with the German Industrial Standard DIN 4188.

The stack of sieves can be agitated by hand or by an agitator of a testing machine.

After termination of the sieving time, usually also established by a particular standard, e.g. the German Industrial Standard DIN 66 165, the residues on the sieves of the stack and the material collected in the tray are collected from the respective surfaces, by brushes or the like and swept into respective containers and weighted. The weights of the individual residues and the weight of the particular material passing through the finest sieve are calculated in proportion to the total weight of the starting sample and the resulting particle-size distribution is presented either as a table or a curve on an appropriate grid or histogram.

It has been found that the removal of the residues after the sifting process as determined has posed a problem with conventional systems, especially where there was a danger of incomplete removal from very fine sieve fabrics, and with the precise weighing of the respective portions.

In addition, both the removal of the portions of the particles on the sieve surfaces and in the tray and the weighting process are labor intensive procedures which are susceptible to variation depending upon the personnel carrying them out. This, of course, can influence the weighting percent or mass percent of a particular component and thus the graphic display of the particle-size distribution or the histogram.

Especially in quality-control operations of particle-size distribution measurements there may be a problem since such systems require complete exclusion of subjective actions by the quality-control personnel.

Furthermore, utilizing conventional systems, a sieve analysis may take anywhere between 15 and 45 minutes, depending upon the material, the fineness, the sieving time and the type of analysis presentation which is desired.

OBJECTS OF THE INVENTION

It is the principal object of our present invention to provide an analytical sieve apparatus which can operate free from the disadvantageous human factors which might be detrimental to precise measurement and thus can provide a more rapid and more accurate determination of the particle-size analysis of a particulate material than earlier systems.

Another object of the invention is to provide an apparatus which is capable of overcoming drawbacks of prior art stacked-sieve analysis systems.

SUMMARY OF THE INVENTION

These objects and others which will be come more readily apparent hereinafter are attained, in accordance with the invention, in an analytical sieve apparatus which comprises:

a machine frame;

a vertical set of sieves mounted on the frame above a sieve tray, the sieves having downwardly decreasing sieve-passing screening apertures for collecting on the sieves and in the tray portions of a particulate material delivered to the set in accordance with a particle-size distribution of the particulate material;

lifting means on the frame for lifting the sieves from one another and from the tray to form an expanded assembly of the sieves;

tilting means on the frame for tilting the assembly together with the lifting means about a horizontal axis to discharge downwardly the portions of the particulate material on the sieves and the tray; and collecting means at the frame and including a respective collector assigned to each of the sieves and the tray for receiving individually the respective portions of the particulate material.

According to the invention, therefore, the sieves of the sieve set are lifted from one another and from the sieve tray below the stack by means of a lifting unit mounted on the machine frame, the entire sieve-assembly, including the lifting unit or units, swung about a horizontal axis from an upright position in which the sifting is effected into a tilted position in which the contents of the sieves and the tray are dumped, and collectors are provided for each sieve and the tray to receive the respective portion of the sieved material dumped thereby.

With this construction, it is possible to greatly accelerate the sieving process and, of course, the steps leading to the ultimate analysis.

While the sample of the particulate material which is delivered to the stack at the uppermost sieve thereof can be manually supplied, preferably one or more conveyors can be disposed above the stack to deliver the samples automatically thereto at the cadence of analysis.

After the particular sample has been deposited upon the upper sieve, according to the invention, the entire sieve tower or stack is set in vibration by the agitating means. The strength of the vibration, e.g. the throw of the vibrating magnets or an eccentric serving as the agitating means, can be selected individually for the particular sample or product to be subjected to the particle-size analysis.

It is advantageous to superimpose upon the vibration an initial shock pulse or a number of such pulses to allow even materials which pass through sieves only with difficulty to be readily distributed throughout the stack depending upon particle size.

The sieve time, i.e. the duration of agitation, is freely selectable. At the end of the sifting stage, the sieves are lifted from one another and from the sieve tray by means of the lifting device or devices mounted on the machine frame.

As a result, a gap is formed between the individual sieves and between the lowermost sieve and the tray.

While the resulting spread or expanded assembly can then be swung manually between the upright position and the tilted position, we prefer to provide a motor drive for tilting the stack into its tilted position.

In the tilted or discharge position, the rim of each sieve containing a residue of the particulate material and the rim of the tray is disposed above a respective collector, e.g. a funnel or shoot, carrying the discharged particulate material into a respective receptacle or container. Thus the individual portions of particulate material are individually collected and can be weighed.

For complete emptying of the sieve assembly and the tray, it is possible to excite the vibrating or agitating means in the tilted position to ensure that all traces of the particulate material collected on the respective sieves and on the tray are cast into the respective funnels.

After complete emptying of the sieves and the sieve pan, the sieve assembly is returned to its starting position, i.e. its upright position and the sieves are lowered into abutting relationship with one another and the tray to close the aforementioned gaps. Indeed, the sieves can be so provided that they are forced together and against the tray in forming the closed tower which is ready for the next sieve analysis.

After the filling of the sieve set or column with the particulate material or even for the course of this filling, the entire apparatus can operate automatically and without manual or human intervention so that the entire sieve analysis is shortened in time and can run free from human error and subjective effects.

It is no longer necessary for operating personnel to remove the individual sieves from the stack at the end of a sifting operation manually and to manually empty them.

The cadence of operation of the apparatus and thus the maximum number of analyses before unit time will depend practically only upon the required sifting time for the respective products. The preferably completely fully automatic filling and emptying of the sieve set requires only a fraction of the time usually found to be necessary for these steps.

According to a feature of the invention, the sieves of the set are axially shiftable parallel to the central vertical axis of the stack in its upright position on mutually-parallel rods mounted on the machine frame. The sieves of the set can advantageously be biased into the contracted or closed position by a force-storing means, e.g. tension springs and can be held against the tray resiliently thereby. The lifters can be fluid cylinders which act against the force of the springs and serve to lift the sieves from one another and the tray. The sieves themselves can be connected together and connected to the tray by lost-motion linkages which permit the opening movement of the stack.

More particularly, the sieves are connected to one another and to said tray by variable length tractive elements lifting each sieve from a next-lower sieve and from said tray upon an elevation by said piston-and-cylinder arrangement of an uppermost sieve of said set.

The tractive elements can include a link on one of said sieves provided with an elongated slot and a pin on an adjacent sieve engageable in said slot, said slot having one end abutting said pin in a fully expanded position of said assembly and another end engaging said pin in a fully contracted position of said set.

The springs can be coil-tension springs while the fluid cylinder can be a pneumatic cylinder. In practice, when the pneumatic cylinders coupled to the sieves are actuated, the sieves are spread apart and away from the tray against the forces of the springs so that the links limit the relative axial displacement of sieves relative to one another and to the tray, thereby ensuring a definite gap between the individual sieves and between the lowermost sieve and the tray.

After tilting and emptying of the sieves, the lifting cylinders are vented so that the sieve set can be contracted and pressed together and against the tray in preparation for the next analysis. Lost motion links between the sieves and between the lowermost sieve and the tray can be formed as well by chain or cable elements.

According to another feature of the invention, each of said collectors comprises a respective funnel positioned to receive the respective portion, said funnels being arrayed in a line along said sieves upon tilting of said assembly through at least about 110° from the vertical to receive the respective portion from an edge of the respective sieve.

Preferably, each collecting funnel is coupled with a receptacle as described and a respective weighing device.

With the apparatus of the invention, therefore, we can ensure that each of the particle classes into which the sieve set separates the particular material, will pass via a respective funnel into a corresponding receptacle which can be mounted upon a suitably tared commercial or conventional weighing scale.

The scales can be coupled with the evaluating electronics which can include a data processor or computer and a printer or plotter for the graphic display of the data in one of the forms described above. Here too the possibility of errors is reduced, especially since false readings of the scales or calculations of percentage values can be avoided.

The automatic system of the invention also eliminates the danger of conscious or subconscious matching of measured values to predetermined set point values as frequently occurs in routine quality-control testing. By providing the apparatus of the invention in a product bypass and with a relatively high analysis cadence, a continuous fully automatic production control can be provided with, if desired, outputting of a signal upon deviation from a standard.

According to another feature of the invention, at least one conveyor and preferably a plurality of conveyors can be provided above the mouth of the sieve set formed by the uppermost sieve in the upright position of the set. This conveyor can be fed in turn with the particulate material samples by other conveyors and may be provided with drying means or downstream from a drying device for the particulate material.

The conveyors for the particulate material can be formed as vibrating trough conveyors which, if desired, can be provided with heaters for effecting sample drying.

According to another feature of the invention, each of the sieves includes an annular sieve frame having a rim;

a screening layer spaced from the rim;

an openwork bottom spaced from the screening layer and having openings larger than those of the screening layer;

a plurality of impact balls disposed between the bottom and the layer with play for impacting from below on the screening layer to dislodge particulate material therefrom; and a segmental cage between the bottom and the screening layer for uniformly spacing the impact balls between the bottom and the screening layer.

The segmental cage can be formed with a circular central segment receiving one of the balls and a plurality of additional segments defined between radial ribs and each receiving a respective one of the balls.

The freely impacting balls, held generally in place by the cage, can ensure impact from below upon the sieve surfaces to generate the requisite sieve cleaning and ensure full discharge of the collected material. The cage ensures uniform impact upon the screen so that the impact effect covers substantially the entire area thereof. The reduced strains resulting from the elimination of manual cleaning of the screens, ensures an increased screen life which is especially important for the very fine and most expensive sieve fabrics.

BRIEF DESCRIPTION OF THE DRAWING

The above and other objects, features and advantages of the present invention will become more readily apparent from the following description, reference being made to the accompanying drawing in which.

SPECIFIC DESCRIPTION

The analytical sieve apparatus shown in FIGS. 1–7 comprises a set 3 of sieves and which is shown to be composed of four superposed stacked sieves 12 and a sieve tray 26 disposed below the lowermost sieve.

Figure 1:
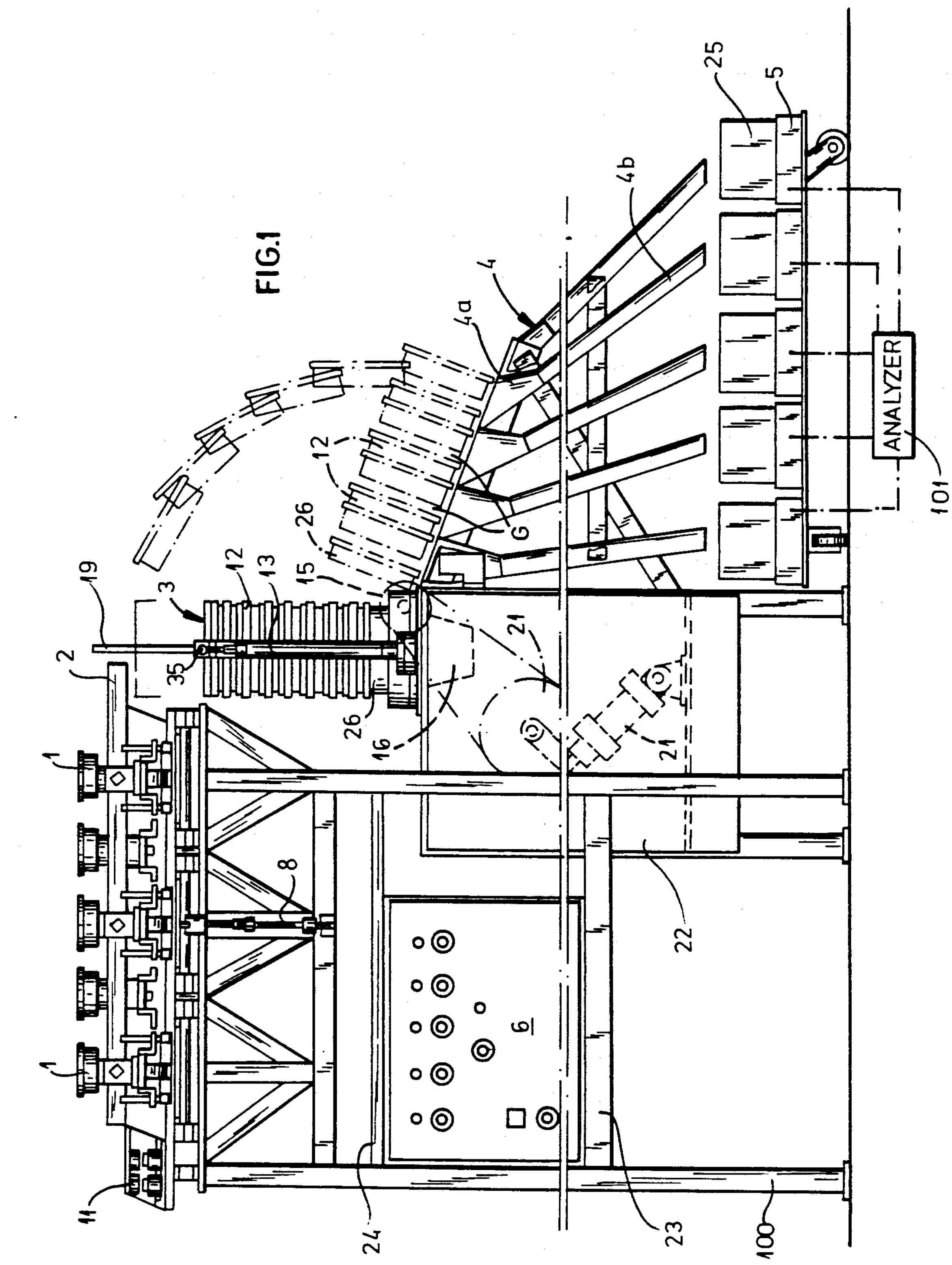
FIG. 1 is a side elevational view of an analytical sieve apparatus according to the invention.

The stack can rest upon a base plate 17 (FIG. 2) on the frame 100 of the apparatus and forming the vibrated element of a vibration generator in the form of a vibrating magnet shown diagrammatically at 16 in FIG. 1. The principles of such vibrators are well known in the art and hence the vibrator has not been illustrated or described in greater detail.

The sieves 12 can be lifted from one another and from the sieve tray 26 by means of lifting elements (pneumatic cylinders) 13 against the force of a force-storing means formed by tension springs 14.

The entire assembly of the sieve set 3, elements 13 and elements 14 is pivotable about a horizontal axis from the normal vertical position of the stack visible in FIG. 1 in solid lines into a tilted position of the stack chain in dot-dash lines.

The horizontal axis is formed by a journal bearing 15.

In the region at which each of the sieves 12 discharges, and in the region in which the sieve tray 26 discharges, respective collectors for the retained portion of the particulate material are provided. These collectors include funnel combinations 4, each having a funnel 4*a* and a respective tube 4*b*, the funnels being arrayed along a line.

The set of sieves 3 are axially shiftable along rods 19 mounted on the frame 100 and likewise parallel to the vertical axis of the stack 3 and swingable with the assembly described.

The tension springs 14 can be anchored to the tray 26 or to the base plate 17 to draw the sieves against one another and against the tray 26.

The lifting elements can be pneumatic cylinders 13 which are supported on the base plate 17 and can engage at the free ends of the respective pistons against corresponding projections 35 of the upper sieve unit 12.

Figure 2:
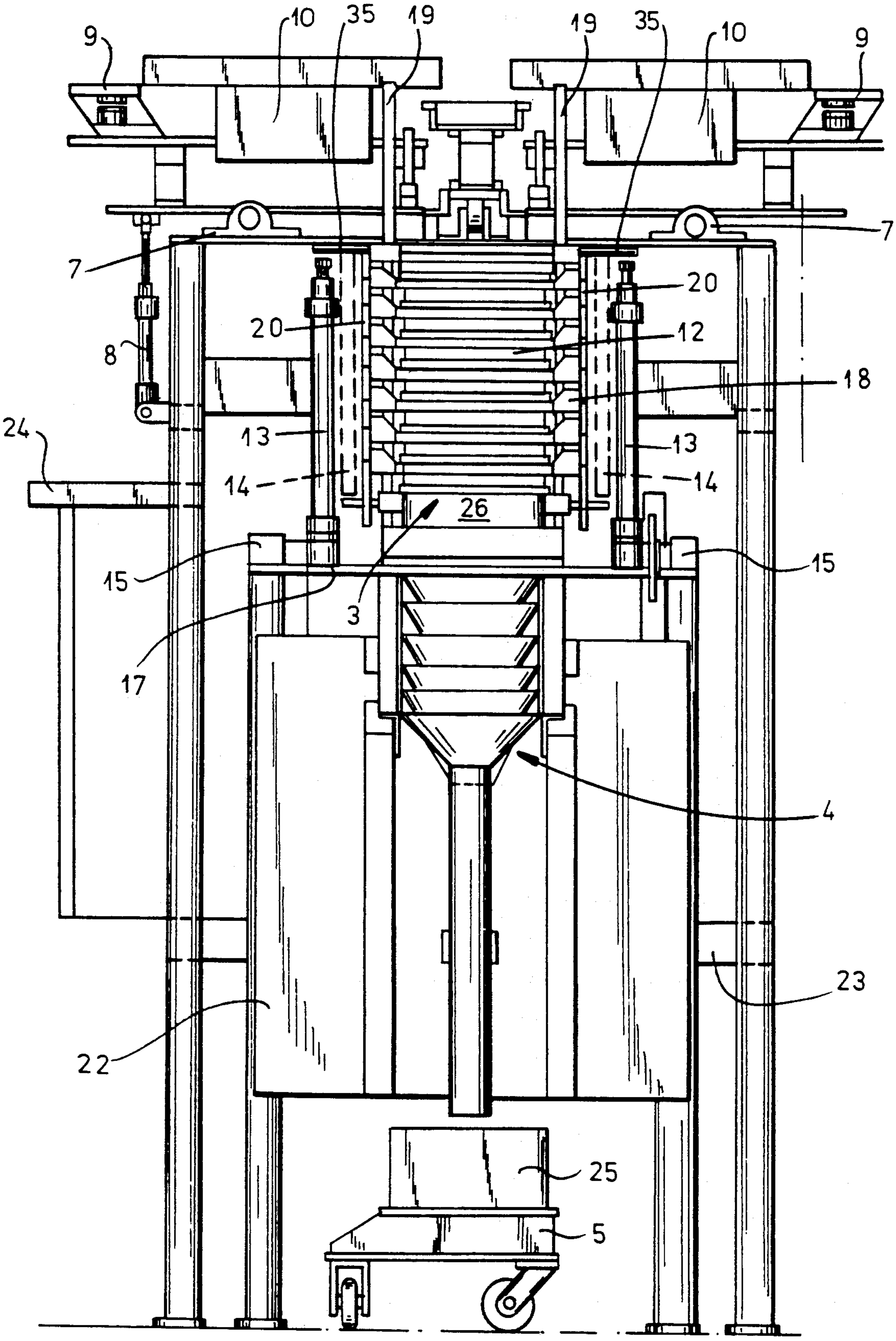
FIG. 2 is a front view thereof.
Figure 3:
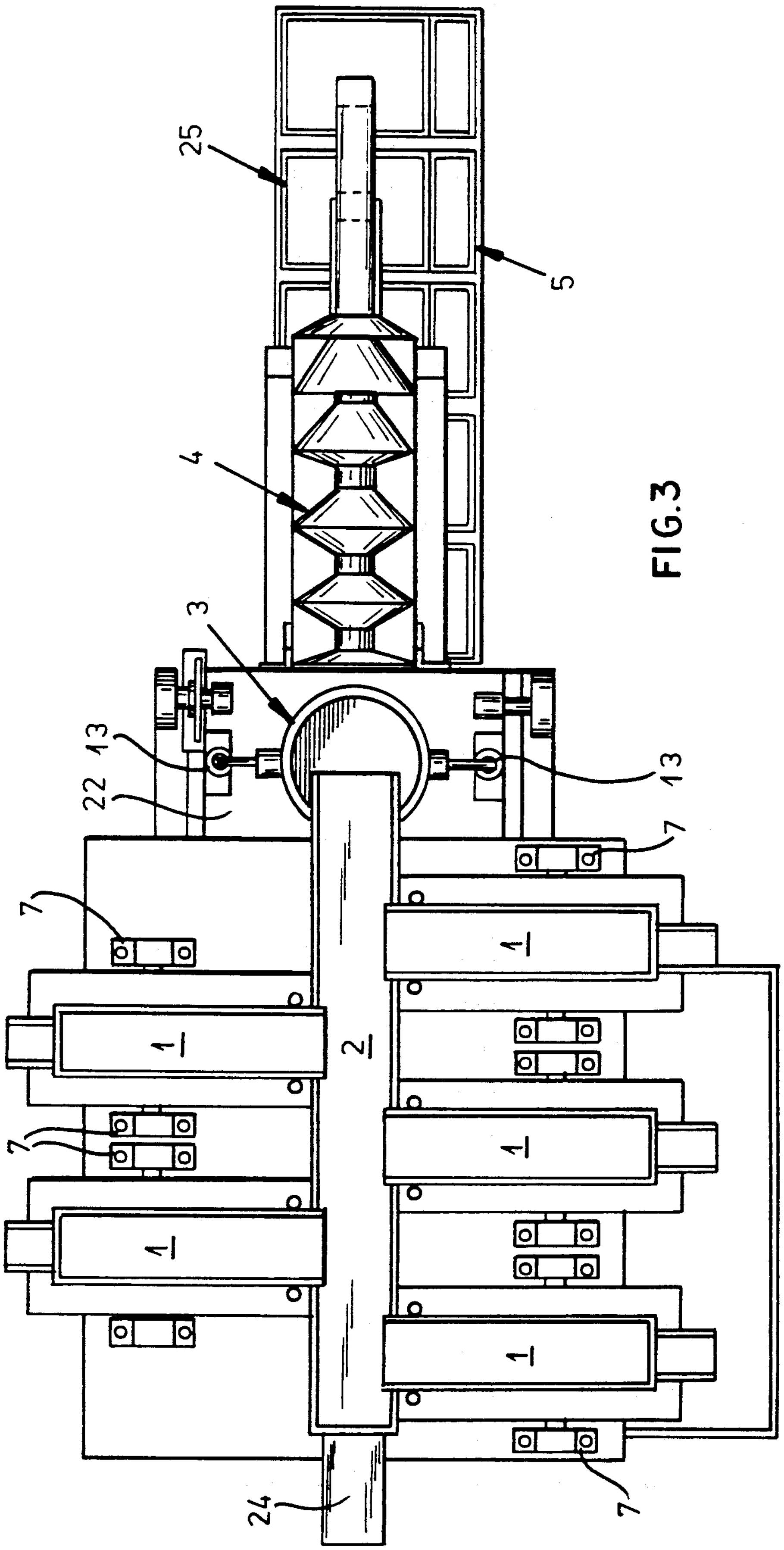
FIG. 3 is a top plan view of the apparatus.
Figure 4:
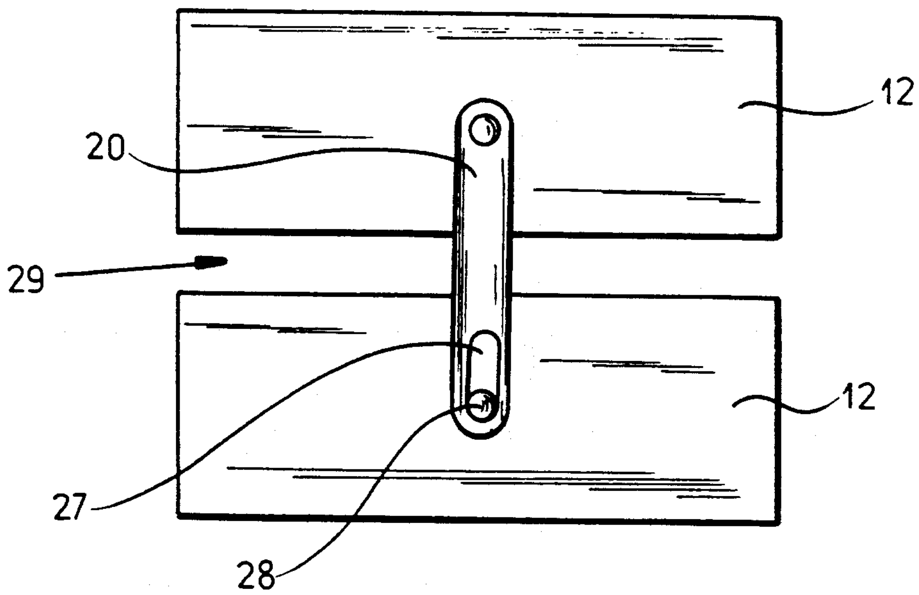
FIGS. 4 and 5 are detail views of the link between the sieves in opposite extreme positions.
Figure 5:
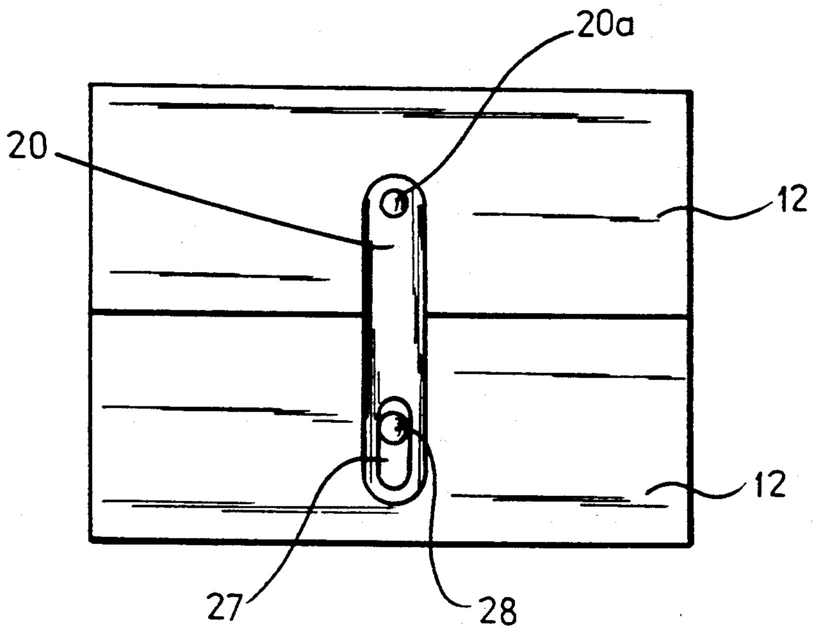

To generate gaps between the sieves, for example gaps G shown in FIG. 1, the pneumatic cylinder 13 can be energized so that the free end of its piston entrains the projections 35 upwardly to lift the uppermost sieve against the force of the coil spring 14 (FIG. 2). The sieve units 12 are connected together and with the sieve tray 26 via variable-length links whose maximum length change defines the width of the gaps G between the sieves and between the lowermost sieve and the tray 26.

The variable length links (FIGS. 4 and 5) comprise link members 20 connected by pins 20*a* to an upper sieve 12 and formed with a slot 27 in which a pin 28 of the next lower sieve 12 or the tray 26 can engage.

The pin 28 is so dimensioned with respect to the slot 27 that it will engage one end of the slot (FIG. 4) to define the gap 29 and will allow the sieves to abut one another and the tray (FIG. 5) in an opposite end position.

The funnels 4*a* of members 4 lie along a line and are positioned to be disposed just below the openings of the rims of the spread sieve assembly and the rim of the tray 26 upon a rotation of that assembly through about 110° from the vertical to the tilted position shown in dot-dash lines in FIG. 1.

At their lower ends, the funnels open into respective receptacles 25 for collecting the particulate material from the respective sieve or tray.

Each receptacle 25 rests upon a tared scale or weighing device 5 which can have an electronic output to the analyzer circuitry or printer for outputting the histogram, graphic display of the particle-size distribution or printed table. Above the mouth of the uppermost sieve 12 of the sieve set 3 in its supported position as shown in FIG. 1, a conveyor trough 2 is provided to feed the particle sample to be analyzed to the set of sieves.

Additional conveyors, also in the form of vibrating troughs, can be provided at 1 to deliver samples to the trough 2. The conveyor troughs 1 can each be provided with a heater 10 for the particulate material to serve as a drier.

Figure 6:
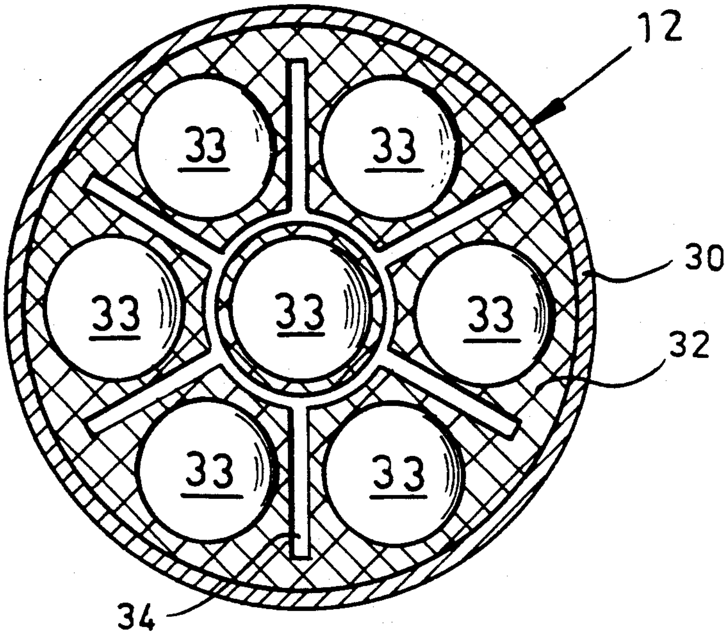
FIG. 6 is a horizontal section through the lower portion of the sieve according to the invention.
Figure 7:
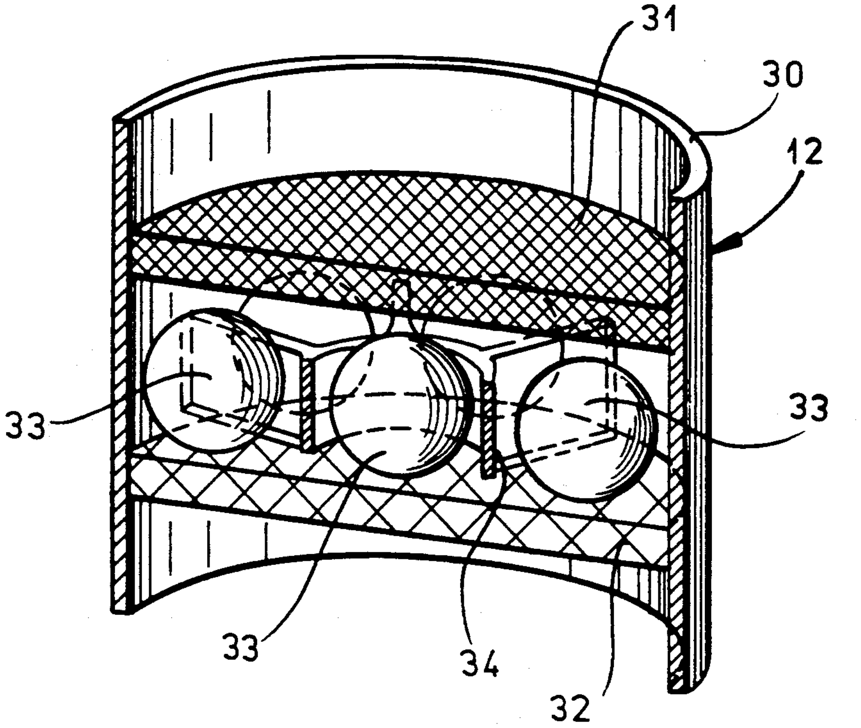
FIG. 7 is a perspective axial section through the sieve of the set.
Figure 8:
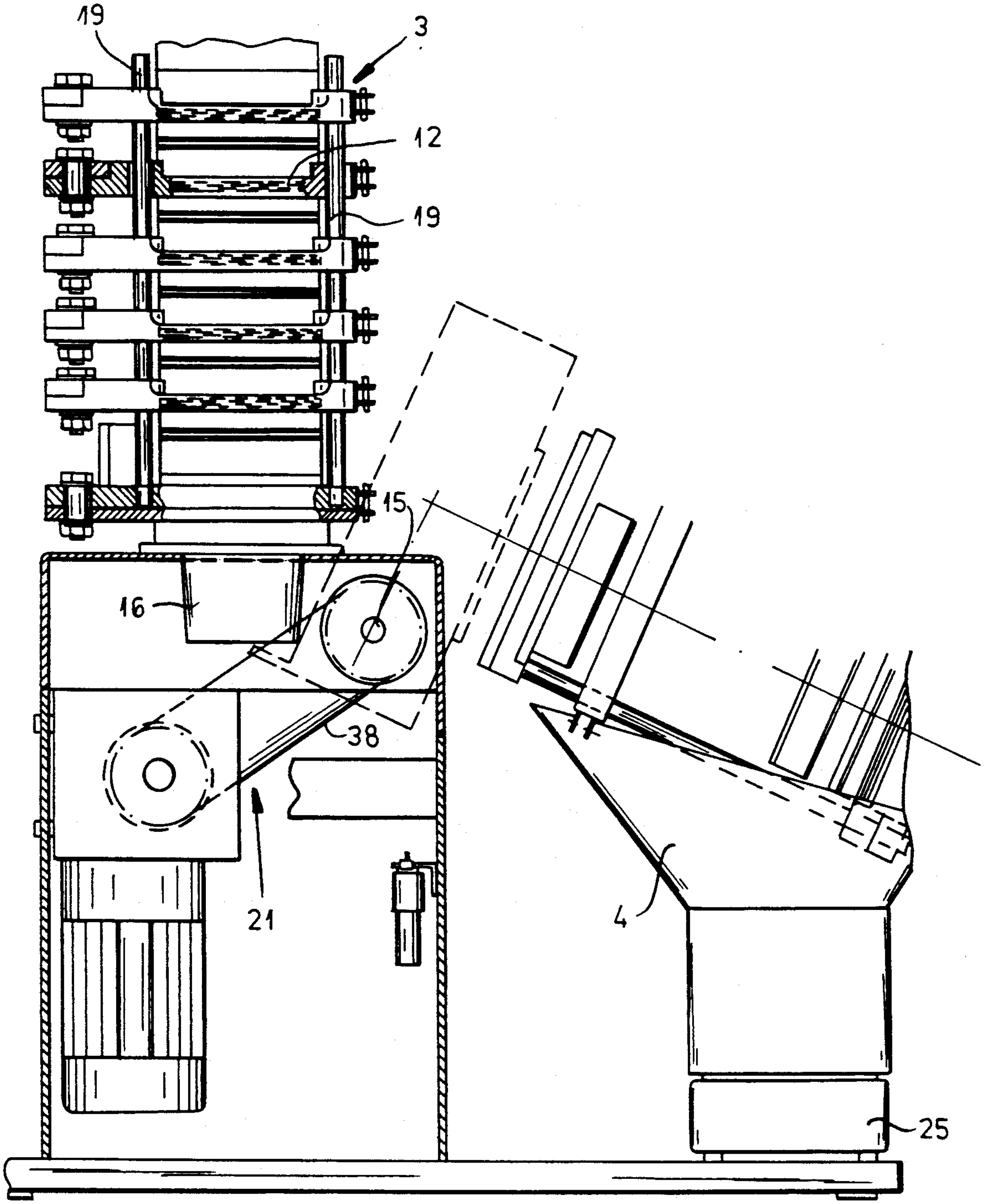
FIG. 8 is a side elevational view, partly broken away and partly in diagrammatic form of another embodiment of the invention.

As can be seen from FIGS. 6 and 7, each of the sieves 12 can have an annular frame part 30 which encloses, in spaced relationship from the rim of this frame 30, a replaceable sieve screening 31 and spaced from this screen 31, a bottom 32 of an openwork construction having substantially larger openings than that of the screen 31.

Between the screen fabric 31 and the bottom 32, impact balls 33 are received with play and are uniformly distributed over the underside of the overlying screen 31 by a segmental cage 34. The segmental cage 34 has a ring-shaped central segment and a plurality of radial ribs defining outer segments, each of which receives a receptacle impact ball 33. The automatic analytical sieve apparatus shown in FIGS. 1-7 can separate prepared samples of particulate products of different types into individual fractions, can weigh these fractions, and can automatically provide an output in which the particle-size distribution is displayed.

The cycle begins with the drying of a sample by the heater 10 in a respective vibrating trough conveyor 1.

In the embodiment described, 5, vibratory conveyors 1 can feed respective samples and these conveyors can be tilted slightly rearwardly by the pneumatic cylinder 8 so that the vibration of the magnetic drive 11 for the conveyors results in a continuous circulation of the material within the conveyor system and thus in a short drying time for the samples.

After the predetermined drying time has elapsed, magnetic drive 11 is shut off and the troughs are brought into horizontal position by the pneumatic cylinders 8. Depending upon the sample to be delivered, the magnetic drive 9 of one of the troughs 1 is switched on and the dried product is transferred to the central conveyor trough 2 whose magnetic drive 11 is simultaneously switched on to deliver the sample to the uppermost sieve 12 of the stack.

The sieve of the uppermost unit 12 is the coarsest of the four sampling screens (see the German Industrial Standard DIN 4188) and each of the sieves is provided with a respective impact ball arrangement (as represented by reference numerals 33 and 34).

Naturally, it is also possible to provide a sieve tower or column with only a single sampling sieve.

The four test sieves of the stack, with impact bottoms 32 and sieve tray 26 for receiving the portion which passes the finest sieve, divides the particulate sample into five fractions.

After the filling process is completed by the central vibratory trough 2, the vibrating magnet 16 for the set 3 is switched on automatically or manually and the sieve set 3 is vibrated. The strength of the vibration, i.e. the stroke of the magnets, can be selected to suit the individual requirements of the material to be analyzed.

Superimposed pulses can be applied to the vibration, especially in the case where the particulate material as a material sifts through the sieves only with difficulty. At the same time, the magnetic drive 11 of the central conveyor 2 is shut off.

During the freely selectable sieving time, the test sieves with the impact bottoms 32 and the sieve tray 26 are held together by the tension of the springs 14.

The ball impact device beneath each sieve screen comprises a number of freely movable impact balls 33 distributed uniformly by a segmental cage 34 which also can move freely on the impact bottom 32. In combination with the vibration generated by the magnets 16, these balls which are caused to impact by the vibration on the undersides of the screens, prevent blocking of the sieves and thus promote the sifting step.

The free mobility of the impact ball 33 and the segmental cage 34 means that the balls will impact at various points along the screen as the balls and cage move horizontally and vertically. In addition, the cage 34 can rotate on its impact bottom 32 so that the oscillation generated by the magnet 16 also causes a rotational movement of the cage. The result is a highly uniform impact of the balls 33 against the underside of the respective screen surface.

Upon the conclusion of the sieving time, the magnet 16 is turned off, preferably automatically. The two pneumatic cylinders 13 are actuated to lift the sieves against the tension force of the springs 14.

The tilting drive 21 mounted in a housing 22 of the frame 100, then rotates the expanded stack of sieves about a predetermined angle, for example 110°-115° into the tilted position shown in dot-dash lines.

During the tilting operation, the material in each sieve and in the sieve tray is discharged through the funnels 4 into the respective containers 25. By the time the assembly reaches its fully inclined position, it has been completely emptied.

Since the five particle-size classes are collected in respective receptacles 25 and each of these receptacles is mounted upon a scale 5 for weighing the contents of the receptacle, the electronic analyzer 101 can directly calculate the particle-size distribution and can provide a graphic display through a printer or plotter. The circuitry can be included in the switching housing 6 of the machine.

Following complete emptying of the sieves 12 and the tray 26, the pneumatic cylinder 13 is vented to allow the tension springs 14 to draw the sieves together and against the tray 26.

The drive 21 rotates the assembly in the opposite direction to bring the set 3 of the sieves into the vertical position for the next analysis cycle.

With this apparatus, the time required for a sieve analysis can be significantly reduced since the delivery of the sample by the supply conveyor 2 for the sieve analysis can be effected fully automatically. The removal of the individual portions of the material at the end of the sifting operation, the emptying of the sieves and the weighing of the portions can be effected without disassembly of the set of sieves, also in a rapid and efficient manner.

The cadence for successive analyses and thus the maximum number of sieve analyses per unit time is consequently dependent only on the sifting time of the various products.

The completely automatic filling and emptying of the portions occupies only a fraction of this time. The tendency to plug up the mesh of the sieve fabric and thus the need for special sieve cleaning is reduced or eliminated by the us of the impact ball arrangement. The latter is made more reliable by spreading the impact balls in the segmental cage. As a result, the discharge of collected material by the sieve fabric can be ensured for substantially the entire area thereof.

The sharply reduced need for manual cleaning of the sieve screens results in a material increase in the life of such screens, especially for very fine and expensive sieve fabrics.

The test sieves can be commercially available test sieves with a standard diameter of 200 mm and a height of 50 mm. In case of a required replacement, the sieve fabric can be simply removed from its holder 18 and replaced by a new screen.

The sifting apparatus allows an operation which is practically error free since a false reading of the scales and an inaccurate calculation of the respective percentage value is not possible.

In FIG. 2, a bearing 7 is shown which permits a swinging of the conveyor trough 1 associated therewith out of its normal working orientation into an inclined position relative to the transport direction.

A support 23 is provided in the framework 100 to carry the circuitry closet 6. A resting surface 24 is provided above the circuitry closet 6.

The embodiment of FIGS. 8–11 functions generally similarly to the embodiment of FIGS. 1–7 and has been shown only schematically.

In this embodiment, the lifting elements or lifting the individual sieve units 12 of the sieve set 3 comprises pairs of double-acting pneumatic cylinders 13 which are fastened in the region of the base plate 17 and have appropriate connecting means, such as pipes and the like.

The pneumatic cylinders 13 are each connected in pairs with another to a respective one of the sieve units 12 so that each of the five sieve units 12 is lifted by a respective pair of pneumatic cylinders 13 and is lowered thereby. To this end, the corresponding pneumatic cylinders 13 have their outwardly extending piston rods 36 each connected to the respective sieve unit.

Figure 9:
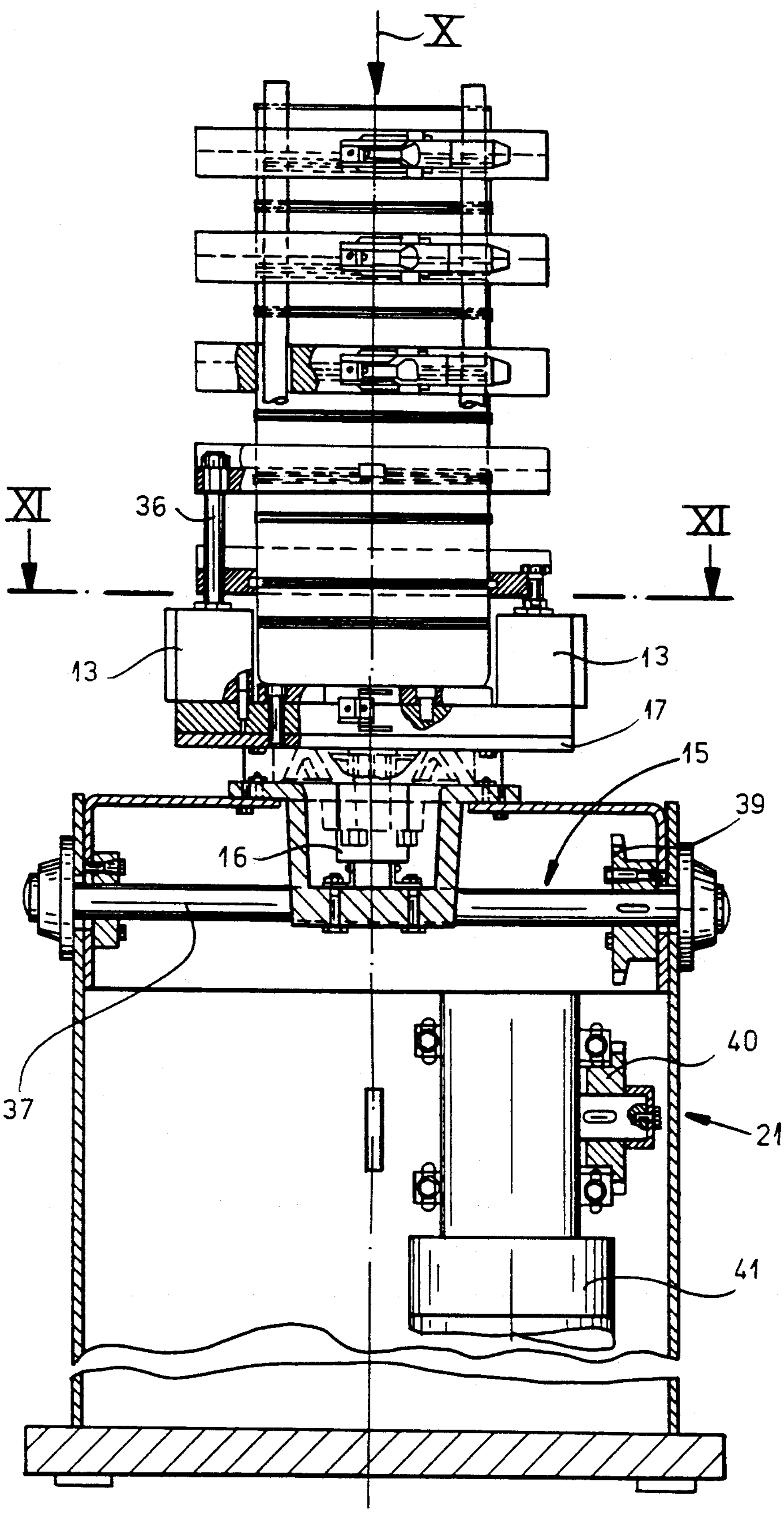
FIG. 9 is a front view of this apparatus, also partly seen in cross section.
Figure 11:
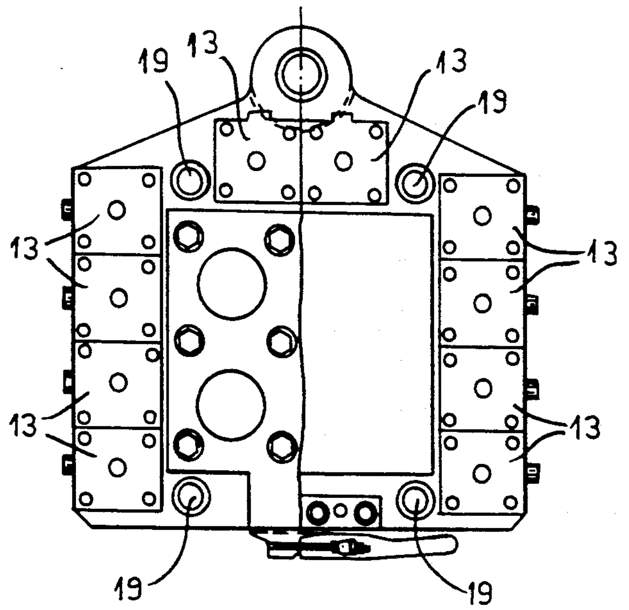
FIG. 11 is a section taken along the line XI—XI of FIG. 9.
Figure 10:
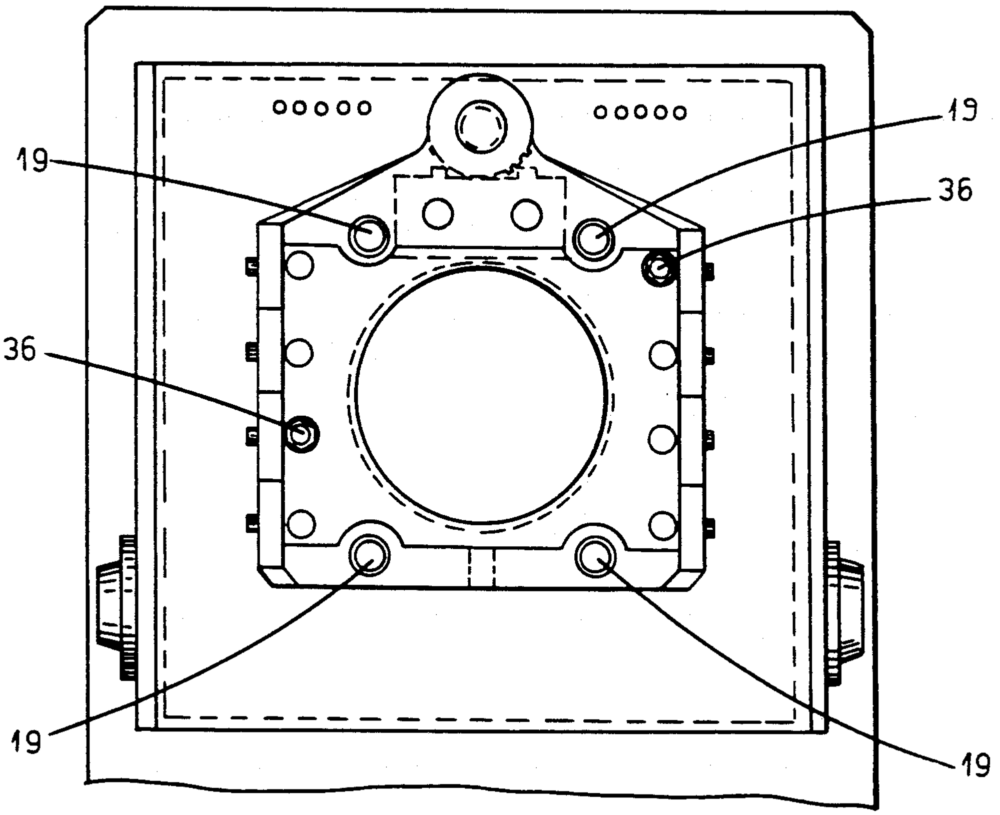
FIG. 10 is a plan view of this apparatus.

Since only half of the assembly is visible in FIG. 9, only a single piston rod can be seen in FIG. 9 while FIG. 10 shows the piston rod pair.

The analytical sieve apparatus of this embodiment operates as follows: The sieve stack, in a closed condition, is filled with the particulate material sample for which particle-size distribution is desired. Then the oscillating magnet 16 is turned on and after a preset time, controlled by a timer switch or the like, the sifting operation is terminated.

The vibratile magnet 16 is turned off and the entire sieve set 3 is swung about the pivot axis 37. The chain drive 38 with a sprocket wheel 39 and a sprocket wheel 40 is connected to a drive motor to rotate the axle of the pivot axis so that the motor 41 can effect the tilting action.

The entire sieve set 3 is then swung downwardly through about 115° so that the uppermost sieve unit 12 empties into its collector 4. The discharged material is collected at 25 and fed to a weighing device.

Upon tilting of the set 3, the vibratile magnet 16 is briefly operated for an adjustable time set by a timer switch so that there is brief shaking of the sieve set which results in complete emptying.

The sieve set is then again swung into the vertical position and is there subjected to a brief shaking by means of vibratile magnet 16. The pneumatic pistons and cylinders upon the next sieve unit and the entire set is tilted again, preferably also with a slight shaking by turning on of the magnet 16. This next sieve then empties into the collector. The process is repeated until all of the sieves of the set are emptied. The cylinders then close the sieve set and the apparatus is prepared for a new sifting operation.

Figure 12:
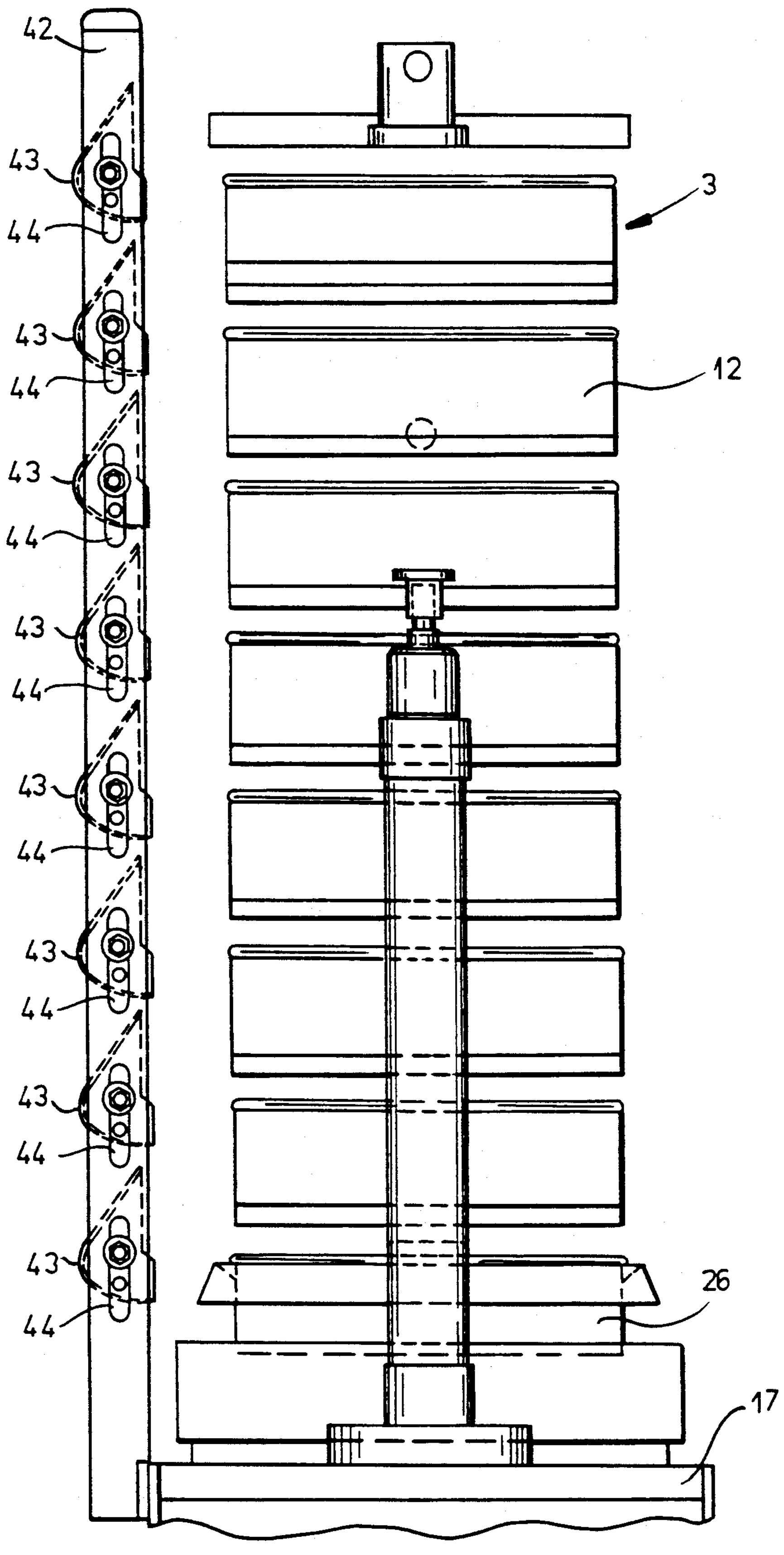
FIG. 12 is a side elevational view partly broken away and showing only some of the elements thereof, of a further embodiment of an apparatus for carrying out an analysis according to the invention.
Figure 13:
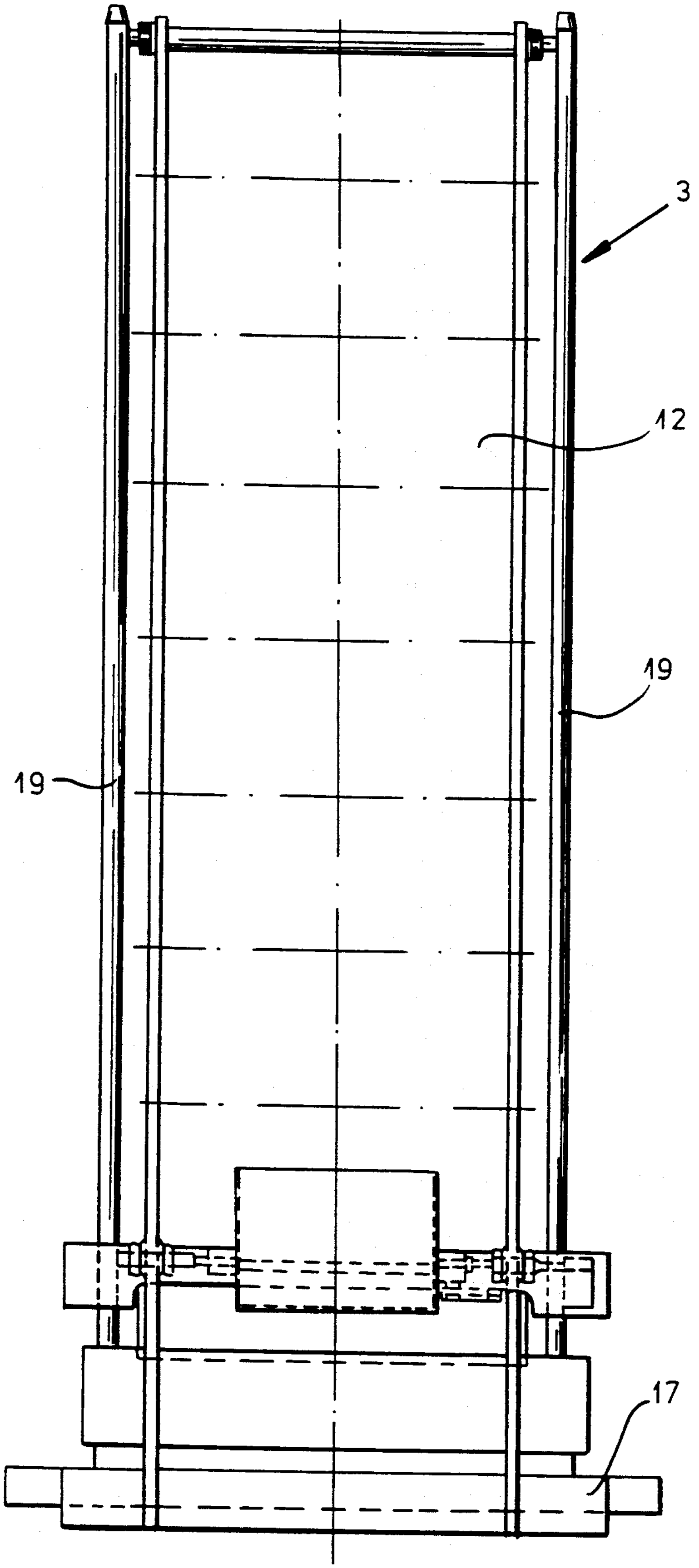
FIG. 13 is a front elevational view of the portion of the apparatus shown in FIG. 12.

In the embodiment of FIGS. 12 and 13, the particulate material is fed to the upper sieve of the set by means of vibrating troughs, conveyors and the like. The sifting time and intensity are set and the analysis apparatus switched on, thereby energizing the vibrating magnet 16. After the lapse of the predetermined sifting time, the assembly is swung through 115° about a horizontal axis and through a horizontal plane thereof. Simultaneously, the vibrating intensity is increased and the sieve units 12 are separated by about 15 mm from one another. This can be achieved by the means described with respect to FIGS. 1–7 or by the means described with respect to FIGS. 8–11.

The separated portions are collected in troughs 43 affixed by frame parts 42 to the base plate 17. The collecting troughs can be discharged via programmable pneumatic cylinders one after another via a funnel into an electronic weighing device 5.

After each emptying of a collecting trough 43, the weighing, analysis and documentation can be effected, preferably by data processing. Into the collecting receptacle, the individual collecting troughs 43 can be emptied one after another so that additive weighing and analysis is effected.

After emptying of the collecting troughs and the completion of the weighing process, the results can be displayed and the analysis apparatus reset to its starting point for a new portion of the particulate material to be analyzed.

We claim:

1. An analytical sieve apparatus, comprising:

a machine frame;

a vertical set of sieves mounted on said frame above a sieve tray, said sieves having downwardly decreasing sieve-passing screening apertures for collecting on said sieves and in said tray portions of a particulate material delivered to said set in accordance with a particle-size distribution of said particulate material;

lifting means on said frame for lifting said sieves from one another and from said tray to form an expanded assembly of said sieves;

tilting means on said frame for tilting said assembly together with said lifting means about a horizontal axis to discharge downwardly the portions of said particulate material on said sieves and said tray; and collecting means at said frame and including a respective collector assigned to each of said sieves and said tray for receiving individually the respective portions of said particulate material.

2. The apparatus defined in claim 1 wherein said assembly includes at least two parallel rods extending parallel to an axis of said set and connected to said frame, said sieves being guided for axial movement along said rods, and force-storing means biasing said sieves toward one another and toward said tray; said lifting means including at least one fluid-operated piston-and-cylinder arrangement for displacing said sieves against a force of said force-storing means.

3. The apparatus defined in claim 2 wherein said force-storing means is a tension spring.

4. The apparatus defined in claim 2 wherein said sieves are connected to one another and to said tray by variable length tractive elements lifting each sieve from a next-lower sieve and from said tray upon an elevation by said piston-and-cylinder arrangement of an uppermost sieve of said set.

5. The apparatus defined in claim 4 wherein said tractive elements include a link on one of said sieves provided with an elongated slot and a pin on an adjacent sieve engageable in said slot, said slot having one end abutting said pin in a fully expanded position of said assembly and another end engaging said pin in a fully contracted position of said set.

6. The apparatus defined in claim 5 wherein each of said collectors comprises a respective funnel positioned to receive the respective portion, said funnels being arrayed in a line along said sieves upon tilting of said assembly through about 110° from the vertical to receive the respective portion from an edge of the respective sieve.

7. The apparatus defined in claim 6 wherein each of said collectors is connected to a respective receptacle for particulate material and a respective weighing device for weighing the respective portion.

8. The apparatus defined in claim 7, further comprising at least one particulate material conveyor on said frame above said set for depositing the particulate material in said sieves, and means for drying said particulate material.

9. The apparatus defined in claim 1 wherein each of said collectors comprises a respective funnel positioned to receive the respective portion, said funnels being arrayed in a line along said sieves upon tilting of said assembly through about 110° from the vertical to receive the respective portion from an edge of the respective sieve.

10. The apparatus defined in claim 1 wherein each of said collectors is connected to a respective receptacle for particulate material and a respective weighing device for weighing the respective portion.

11. The apparatus defined in claim 1, further comprising at least one particulate material conveyor on said frame above said set for depositing the particulate material in said sieves, and means for drying said particulate material.

12. The apparatus defined in claim 1 wherein each of said sieves includes:

an annular sieve frame having a rim;

a screening layer spaced from said rim;

an openwork bottom spaced from said screening layer and having openings larger than those of said screening layer;

a plurality of impact balls disposed between said bottom and said layer with play for impacting from below on said screening layer to dislodge particulate material therefrom; and a segmental cage between said bottom and said screening layer for uniformly spacing said impact balls between said bottom and said screening layer.

13. The apparatus defined in claim 12 wherein said segmental cage is formed with a circular central segment receiving one of said balls and a plurality of additional segments defined between radial ribs and each receiving a respective one of said balls.

14. The apparatus defined in claim 13 wherein said assembly includes at least two parallel rods extending parallel to an axis of said set and connected to said frame, said sieves being guided for axial movement along said rods, and force-storing means biasing said sieves toward one another and toward said tray; said lifting means including at least one fluid-operated piston-and-cylinder arrangement for displacing said sieves against a force of said force-storing means.

15. The apparatus defined in claim 14 wherein said force-storing means is a tension spring.

16. The apparatus defined in claim 15 wherein said sieves are connected to one another and to said tray by variable length tractive elements lifting each sieve from a next-lower sieve and from said tray upon an elevation by said piston-and-cylinder arrangement of an uppermost sieve of said set.

17. The apparatus defined in claim 16 wherein said tractive elements include a link on one of said sieves provided with an elongated slot and a pin on an adjacent sieve engageable in said slot, said slot having one end abutting said pin in a fully expanded position of said assembly and another end engaging said pin in a fully contracted position of said set.

18. The apparatus defined in claim 17 wherein each of said collectors comprises a respective funnel positioned to receive the respective portion, said funnels being arrayed-in a line along said sieves upon tilting of said assembly through about 110° from the vertical to receive the respective portion from an edge of the respective sieve.

19. The apparatus defined in claim 18 wherein each of said collectors is connected to a respective receptacle for particulate material and a respective weighing device for weighing the respective portion.

20. The apparatus defined in claim 19, further comprising at least one particulate material conveyor on said frame above said set for depositing the particulate material in said sieves, and means for drying said particulate material.

* * * * *